(12) United States Patent
Lacy et al.

(10) Patent No.: US 8,753,083 B2
(45) Date of Patent: Jun. 17, 2014

(54) CURVED COOLING PASSAGES FOR A TURBINE COMPONENT

(75) Inventors: Benjamin Paul Lacy, Greer, SC (US); Brian Peter Arness, Greenville, SC (US); Victor John Morgan, Greenvile, SC (US)

(73) Assignee: General Electric Company, Schenectady, NY (US)

( * ) Notice: Subject to any disclaimer, the term of this patent is extended or adjusted under 35 U.S.C. 154(b) by 476 days.

(21) Appl. No.: 13/006,914

(22) Filed: Jan. 14, 2011

(65) Prior Publication Data
US 2012/0183412 A1 Jul. 19, 2012

(51) Int. Cl.
*F01D 5/18* (2006.01)

(52) U.S. Cl.
USPC .................................... 416/97 R; 415/115

(58) Field of Classification Search
USPC ................................. 416/97 R, 92
See application file for complete search history.

(56) References Cited

U.S. PATENT DOCUMENTS

| | | | |
|---|---|---|---|
| 4,111,604 A * | 9/1978 | Kydd | 416/97 R |
| 5,059,289 A | 10/1991 | Gaskell | |
| 5,281,084 A | 1/1994 | Noe et al. | |
| 5,486,093 A | 1/1996 | Auxier et al. | |
| 5,637,239 A | 6/1997 | Aclamski et al. | |
| 6,390,774 B1 | 5/2002 | Lewis et al. | |
| 6,431,833 B2 | 8/2002 | Jones | |
| 6,478,540 B2 | 11/2002 | Abuaf et al. | |
| 6,644,920 B2 | 11/2003 | Beeck et al. | |
| 6,916,150 B2 * | 7/2005 | Liang | 415/115 |
| 7,114,916 B2 * | 10/2006 | Dube et al. | 415/115 |
| 7,147,439 B2 | 12/2006 | Jacala et al. | |
| 7,390,168 B2 * | 6/2008 | Liang | 416/97 R |
| 7,416,390 B2 * | 8/2008 | Liang | 416/97 R |
| 2007/0116569 A1 * | 5/2007 | Cunha et al. | 416/97 R |
| 2007/0116574 A1 | 5/2007 | Itzel et al. | |
| 2007/0201979 A1 | 8/2007 | Veltre et al. | |
| 2007/0286735 A1 * | 12/2007 | Cunha et al. | 416/97 R |
| 2008/0044282 A1 * | 2/2008 | Pietraszkiewicz et al. | 416/90 R |
| 2009/0324421 A1 * | 12/2009 | Ahmad et al. | 416/96 R |
| 2011/0274559 A1 * | 11/2011 | Jenne et al. | 416/97 R |

OTHER PUBLICATIONS

U.S. Appl. No. 12/562,528, filed Sep. 18, 2009.
U.S. Appl. No. 12/721,040, filed Mar. 10, 2010.

* cited by examiner

*Primary Examiner* — Nathaniel Wiehe
*Assistant Examiner* — Michael Sehn
(74) *Attorney, Agent, or Firm* — Dority & Manning, PA

(57) ABSTRACT

A turbine component having a curved cooling passage is disclosed. The turbine component may generally comprise an airfoil having a base and a tip disposed opposite the base. The airfoil may further include a pressure side and a suction side extending between a leading edge and a trailing edge. An airfoil cooling circuit may be at least partially disposed within the airfoil and may be configured to direct a cooling medium through the airfoil. The curved cooling passage may generally be in flow communication with the airfoil cooling circuit such that the cooling medium flowing through the airfoil cooling circuit may be directed into the cooling passage. Additionally, the curved cooling passage may generally extend lengthwise within the airfoil between the leading and trialing edges along at least a portion of one of the pressure side and the suction side of the airfoil.

19 Claims, 6 Drawing Sheets

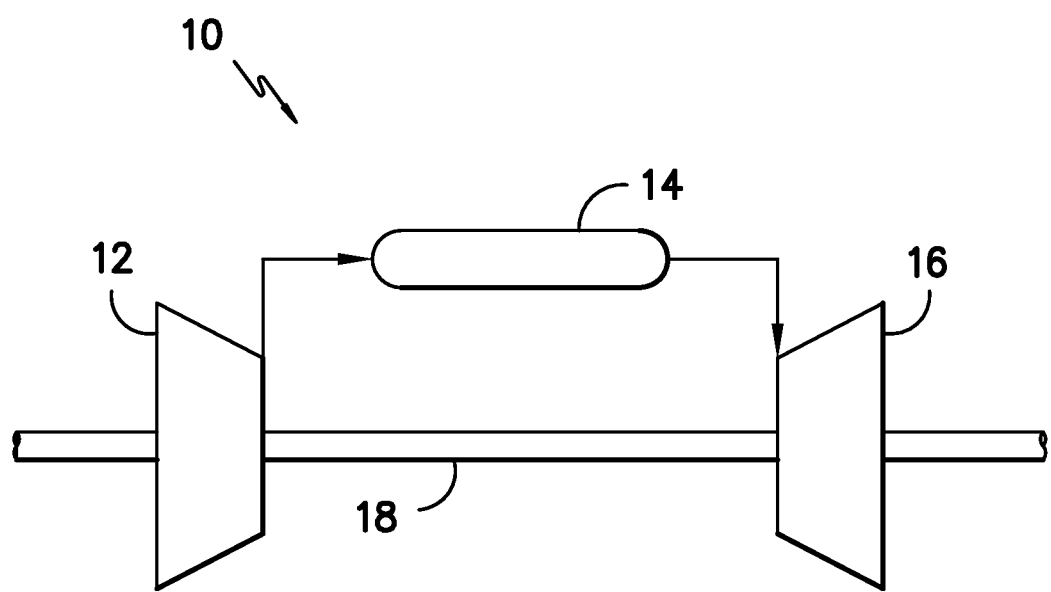
FIG. -1-

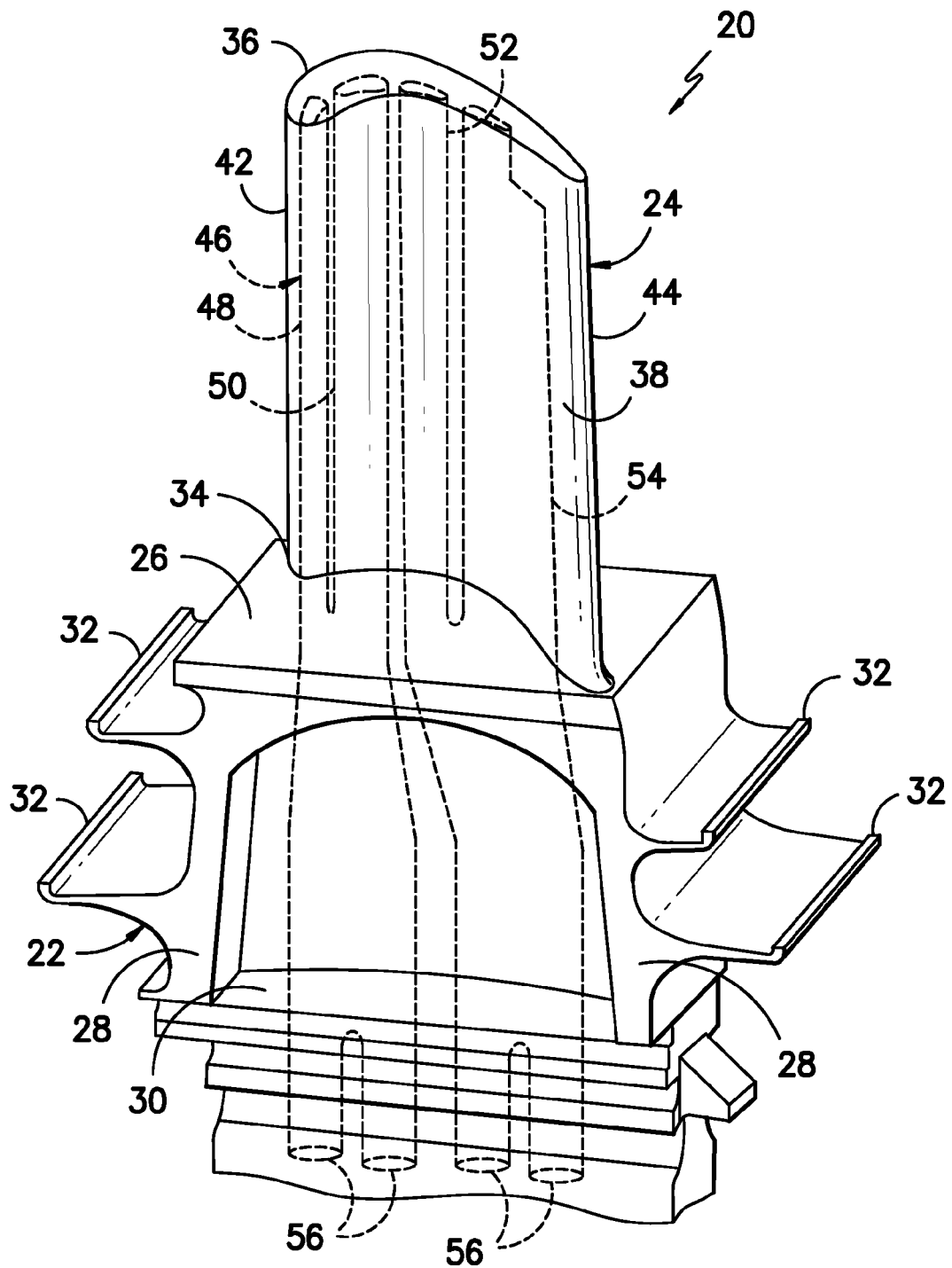
FIG. -2-

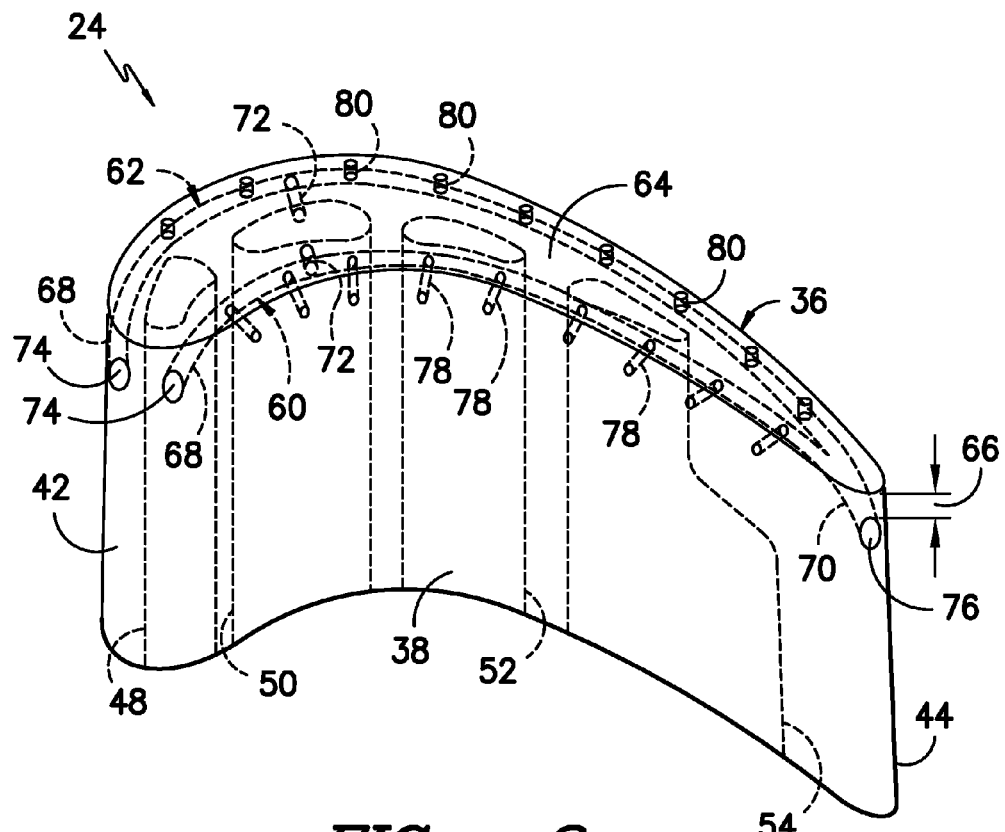
FIG. -3-
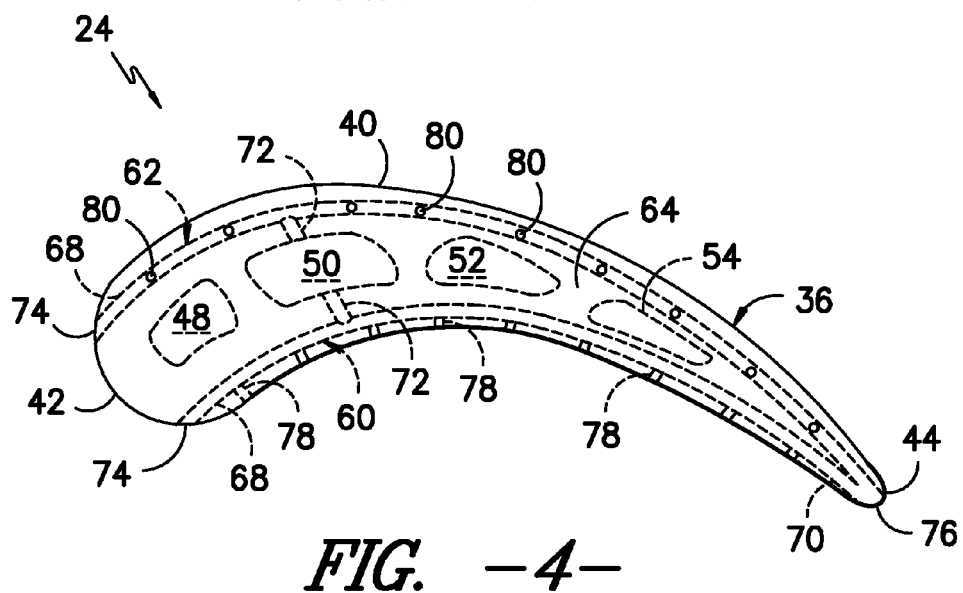
FIG. -4-

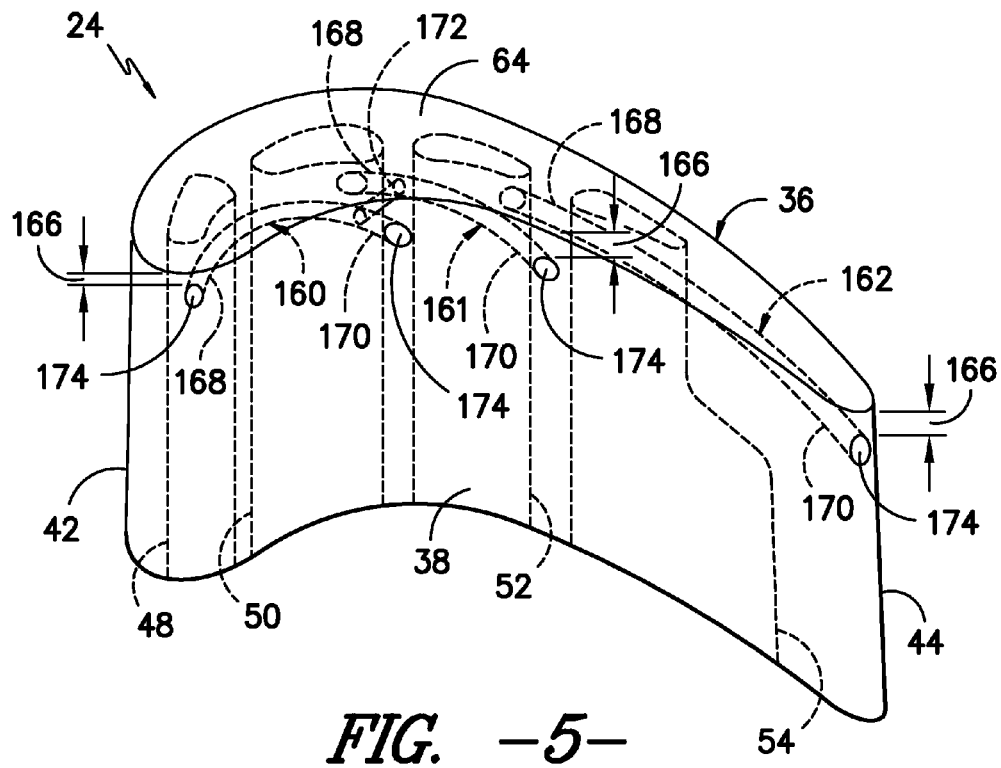
FIG. -5-
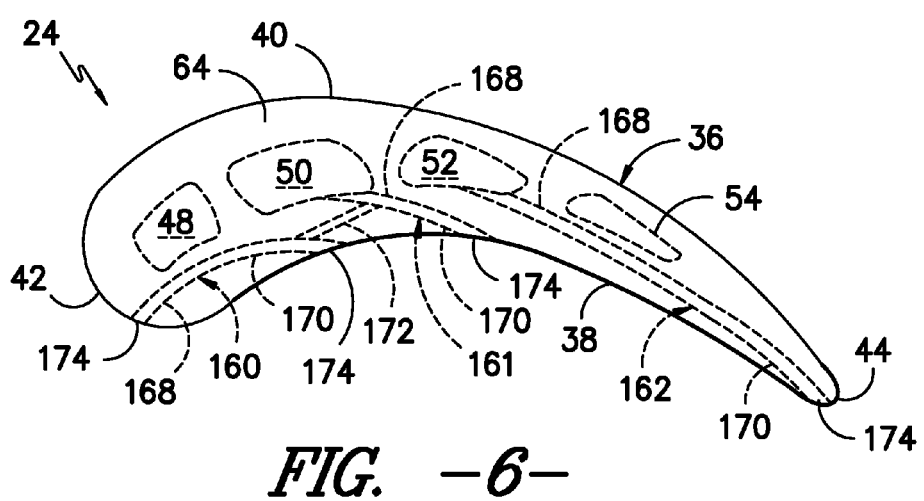
FIG. -6-

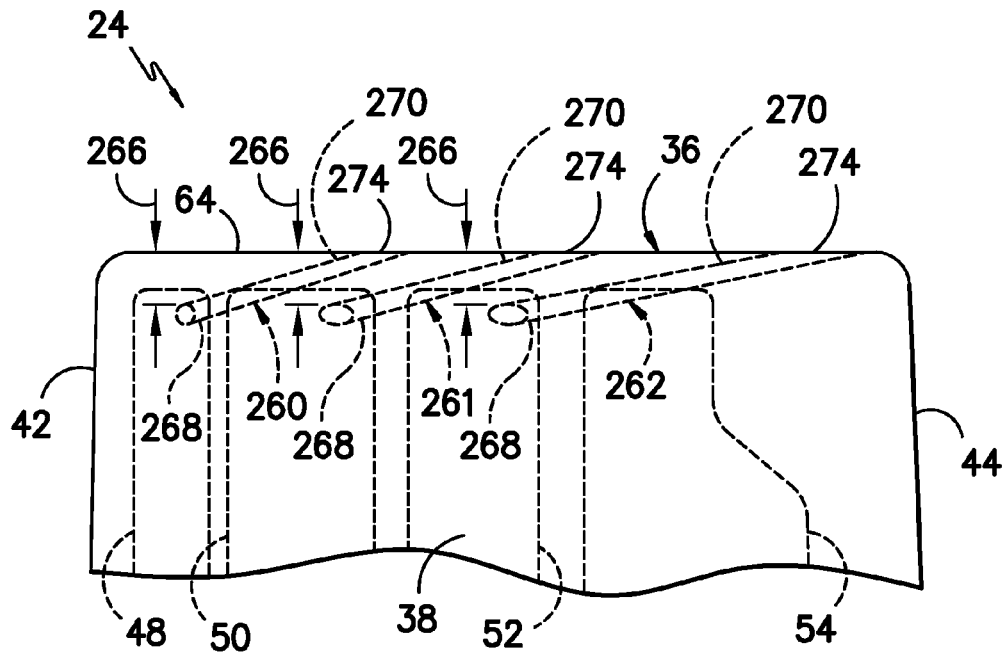
FIG. —7—
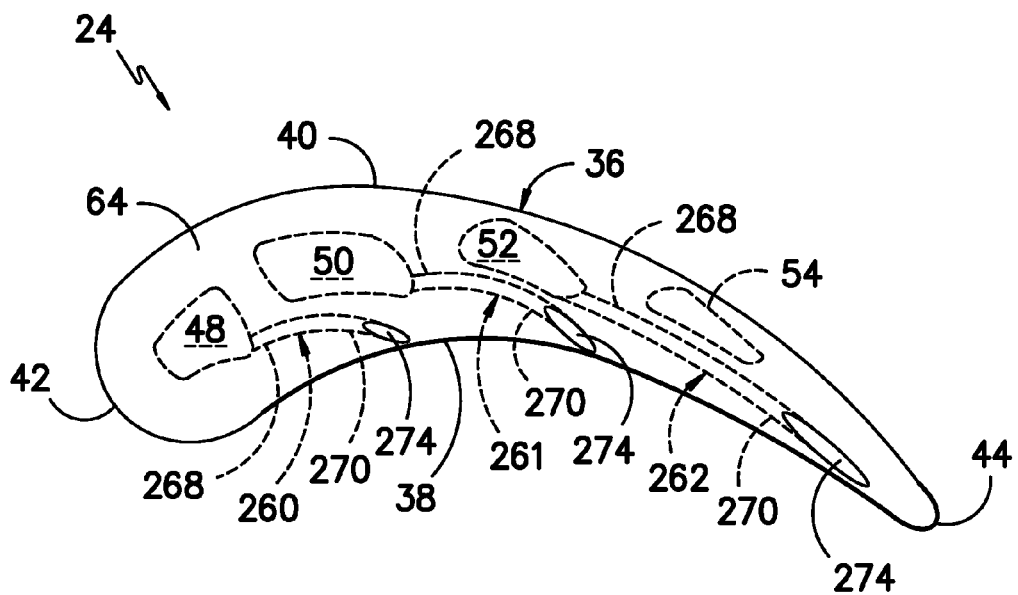
FIG. —8—

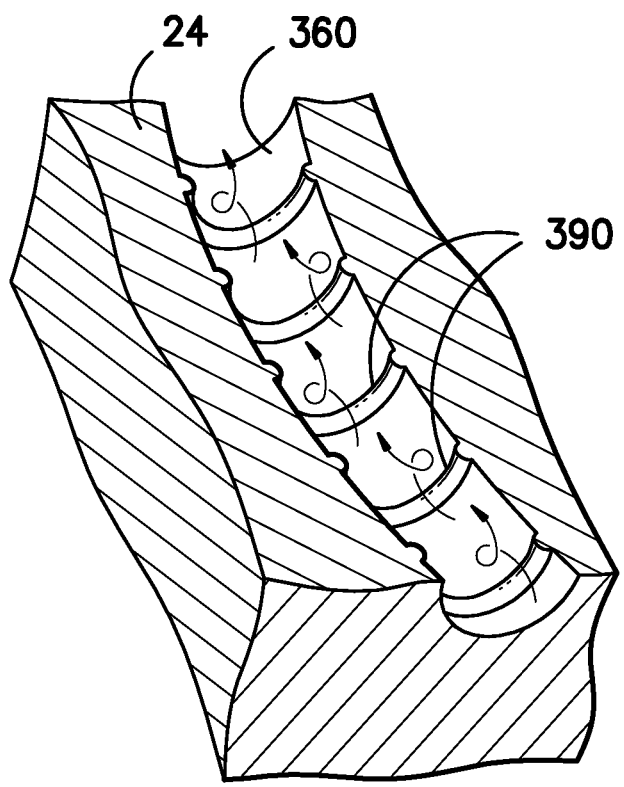
FIG. -9-

CURVED COOLING PASSAGES FOR A TURBINE COMPONENT

FIELD OF THE INVENTION

The present subject matter relates generally to the cooling of turbine components and, more particularly, to a turbine component having curved cooling passages for supplying a cooling medium through the component's airfoil.

BACKGROUND OF THE INVENTION

In a gas turbine, hot gases of combustion flow from an annular array of combustors through a transition piece for flow along an annular hot gas path. Turbine stages are typically disposed along the hot gas path such that the hot gases of combustion flow from the transition piece through first-stage nozzles and buckets and through the nozzles and buckets of follow-on turbine stages. The turbine buckets may be secured to a plurality of turbine wheels comprising the turbine rotor, with each turbine wheel being mounted to the rotor shaft for rotation therewith.

A turbine bucket generally includes an airfoil extending radially upward from a substantially planar platform and a hollow shank portion extending radially downward from the platform. The shank portion may include a dovetail or other means to secure the bucket to a turbine wheel of the turbine rotor. In general, during operation of a gas turbine, the hot gases of combustion flowing from the combustors are generally over and around the airfoil of the turbine bucket. To protect the part from high temperatures, a bucket airfoil typically includes an airfoil cooling circuit configured to provide a cooling medium, such as air, throughout the airfoil in order to reduce the temperature differential between the pressure and suction sides of the airfoil. In addition, the airfoil may have a cooling scheme or arrangement for supplying air to the tip of the airfoil.

Currently, the tips of bucket airfoils are cooled using a series of straight film holes defined along the perimeter of the airfoil near the tip. Specifically, the film holes are drilled radially down and inward from the airfoil surface near the tip into the cooling circuit of the airfoil to permit air flowing through the cooling circuit to be directed up along the tip. However, it has been found that this cooling arrangement provides for less than optimal cooling for the bucket tip. Additionally, such a cooling arrangement requires the drilling of an excessive amount of film holes and also requires the use of an excessive amount of air.

Accordingly, a cooling arrangement for an airfoil of a turbine component which effectively cools portions of the airfoil, such as the airfoil tip, while reducing the amount of cooling holes and air required would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter discloses a turbine component comprising an airfoil having a base and a tip disposed opposite the base. The airfoil may further include a pressure side and a suction side extending between a leading edge and a trailing edge. An airfoil cooling circuit may be at least partially disposed within the airfoil and may be configured to direct a cooling medium through the airfoil. The curved cooling passage may generally be in flow communication with the airfoil cooling circuit such that the cooling medium flowing through the airfoil cooling circuit may be directed into the cooling passage. Additionally, the curved cooling passage may generally extend lengthwise within the airfoil between the leading and trailing edges along at least a portion of one of the pressure side and the suction side of the airfoil.

In another aspect, the present subject matter discloses a turbine component comprising an airfoil having a base and a tip disposed opposite the base. The airfoil further includes a pressure side and a suction side extending between a leading edge and a trailing edge. An airfoil cooling circuit may be at least partially disposed within the airfoil and may be configured to direct a cooling medium through the airfoil. Additionally, a plurality of curved cooling passages may be defined in the airfoil generally adjacent to the airfoil tip. The cooling passages may be in flow communication with the airfoil cooling circuit such that the cooling medium flowing through the airfoil cooling circuit may be directed into the cooling passages. Further, each of the cooling passages may generally extend lengthwise within the airfoil between the leading and trailing edges along at least a portion of one of the pressure side and the suction side of the airfoil.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a schematic depiction of a gas turbine;

FIG. 2 illustrates a perspective view of one embodiment of a turbine bucket;

FIG. 3 illustrates a partial, perspective view of one embodiment of an airfoil of a turbine bucket having a plurality of curved cooling passages defined therein in accordance with aspects of the present subject matter;

FIG. 4 illustrates a top view of the airfoil shown in FIG. 3;

FIG. 5 illustrates a partial, perspective view of another embodiment of an airfoil of a turbine bucket having a plurality of curved cooling passages defined therein in accordance with aspects of the present subject matter;

FIG. 6 illustrates a top view of the airfoil shown in FIG. 5;

FIG. 7 illustrates a partial, side view of a further embodiment of an airfoil of a turbine bucket having a plurality of curved cooling passages defined therein in accordance with aspects of the present subject matter;

FIG. 8 illustrates a top view of the airfoil shown in FIG. 7; and

FIG. 9 illustrates a cross-sectional view of one embodiment of a turbulated, curved cooling passage in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a cooling arrangement for an airfoil of a turbine component. In particular, the present subject matter is directed to a turbine component having one or more curved cooling passages for supplying a cooling medium to specific areas of the airfoil. In several embodiments, the curved cooling passages may be configured to supply a cooling medium on or adjacent to the tip of the component's airfoil. For example, the curved cooling passages may be defined in the airfoil along its outer perimeter (e.g., along the curved shape or profile of the pressure side and/or the suction side of the airfoil) in an area generally adjacent to the airfoil tip. Accordingly, due to curvature of the cooling passages and their placement along the outer perimeter of the airfoil tip, the cooling medium flowing through the cooling passages may be efficiently supplied to the areas on and/or adjacent to the airfoil tip that necessitate cooling. As such, the amount of air, as well as the number of cooling holes, needed to sufficiently cool the airfoil tip may be reduced significantly.

In general, the curved cooling passages of the present subject matter will be described herein with reference to a turbine bucket of a gas turbine. However, it should be readily appreciated by those of ordinary skill in the art that the disclosed cooling passages may generally be defined in any turbine component having an airfoil that requires cooling. Thus, for example, the curved cooling passages may also be defined within a compressor rotor blade of the compressor section of a gas turbine. Additionally, application of the present subject matter need not be limited to gas turbines, but may also be utilized in steam turbines. Further, it should be appreciated that the curved cooling passages may be defined in the components of turbines used for power generation, as well as those used in aviation for propulsion.

Referring to the drawings, FIG. 1 illustrates a schematic diagram of a gas turbine 10. The gas turbine 10 generally includes a compressor section 12, a plurality of combustors within a combustor section 14, and a turbine section 16. The compressor section 12 and turbine section 16 may be coupled by a shaft 18. During operation of the gas turbine 10, the compressor section 12 supplies compressed air to the combustors of the combustor section 14. Air and fuel are mixed and burned within each combustor and hot gases of combustion flow in a hot gas path from the combustor section 14 to the turbine section 16, wherein energy is extracted from the combustion gases to produce work.

Referring now to FIG. 2, one embodiment of a turbine bucket 20 suitable for use within the turbine section 16 of a gas turbine 10 is illustrated. As shown, the bucket 20 generally includes a shank portion 22 and an airfoil 24 extending from a substantially planar platform 26. The platform 26 generally serves as the radially inward boundary for the hot gases of combustion flowing through the turbine section 16 of the gas turbine 10. The shank portion 22 of the bucket 20 may generally be configured to extend radially inwardly from the platform 26 and may include sides 28, a hollow cavity 30 partially defined by the sides 28 and one or more angel wings 32 extending horizontally from each side 28. The shank portion 22 may also include a root structure (not illustrated), such as a dovetail, configured to secure the bucket 20 to a turbine wheel (not illustrated) of the turbine section 16 of the gas turbine 10.

The airfoil 24 of the turbine bucket 20 may generally include an airfoil base 34 extending radially outwardly from the platform 26 and an airfoil tip 36 disposed opposite the base 34. Thus, the airfoil tip 36 may generally define the radially outermost portion of the turbine bucket 20. The airfoil 36 may also include a pressure side 38 and a suction side 40 (FIG. 4) extending between a leading edge 42 and a trailing edge 44. The pressure side 38 may generally define an aerodynamic, concave outer surface of the airfoil 24. Similarly, the suction side 40 may generally define an aerodynamic, convex outer surface of the airfoil 24.

Referring still to FIG. 2, the turbine bucket 20 may also include an airfoil cooling circuit 46 extending radially outwardly from the shank portion 22 in the direction of the airfoil tip 36 for flowing a cooling medium, such as air, water, steam or any other suitable fluid, throughout the airfoil 24. In general, it should be appreciated that the airfoil cooling circuit 46 may have any suitable configuration known in the art. For example, in the illustrated embodiment, the cooling circuit 46 includes a plurality of cooling channels 48, 50, 52, 54 extending radially outwards from one or more cooling medium supply passages 56 to an area of the airfoil 24 generally adjacent the airfoil tip 36. Specifically, as shown, the airfoil cooling circuit 46 includes four radially extending cooling channels 48, 50, 52, 54 configured to flow the cooling medium supplied from the supply passages 56 throughout the airfoil 24. However, one of ordinary skill in the art should appreciate that the airfoil cooling circuit 46 may include any number of cooling channels 48, 50, 52, 54. Additionally, it should be appreciated that, although the cooling channels 48, 50, 52, 54 are illustrated as extending radially towards the airfoil tip 36 as separated channels, the cooling channels 48, 50, 52, 54 may also be in flow communication with one another. For example, the airfoil cooling circuit 46 may be configured as a multiple-pass cooling circuit and may include a plurality of interconnected cooling channels 48, 50, 52, 54 extending radially inward and radially outward within the airfoil 24. Specifically, in one embodiment, the cooling channels 48, 50, 52, 54 may define a serpentine-like path such that the cooling medium within passages 48, 50, 52, 54 flows alternately radially outwardly and radially inwardly throughout the airfoil 24. Moreover, it should be appreciated that the airfoil cooling circuit 46 may comprise an open cooling circuit or a closed cooling circuit. For instance, in one embodiment, the airfoil cooling circuit 46 may include a return passage (not illustrated) for expelling the cooling medium back through the shank portion 22 to the cooling medium source (not illustrated). Alternatively, the cooling medium supplied through the airfoil cooling circuit 46 may be expelled through any number of outlets or holes defined in the airfoil 24.

Referring now to FIGS. 3 and 4, there is illustrated one embodiment of a turbine bucket 20 having a plurality of curved cooling passages 60, 62 for cooling an area of the bucket's airfoil 24 generally adjacent to the airfoil tip 36 in accordance with aspects of the present subject matter. Specifically, FIG. 3 illustrates a partial, perspective view of the bucket's airfoil 24 including a plurality of curved cooling passages 60, 62 defined therein. FIG. 4 illustrates a top view of the airfoil 24 shown in FIG. 3, particularly illustrating the surface 64 of the airfoil tip 36.

In general, the curved cooling passages 60, 62 of the present subject matter may be configured to direct a cooling medium along at least a portion of the outer perimeter of the airfoil 24. For example, in several embodiments, the curved cooling passages 60, 62 may be configured to direct a cooling medium along the outer perimeter of the airfoil 24 in an area generally adjacent to the airfoil tip 36. Thus, in the illustrated embodiment, a first curved cooling passage 60 may be defined generally adjacent to the airfoil tip 36 and may extend lengthwise along the pressure side 38 of the airfoil 24. Additionally, a second curved cooling passage 62 may be defined generally adjacent to the airfoil tip 36 and may extend lengthwise along the suction side 40 of the airfoil 24. However, it should be appreciated that, in alternative embodiments, multiple curved cooling passages may be defined on the pressure side 38, the suction side 40 and/or may extend between the pressure and suction sides 38, 40 of the airfoil 24. Further, in another embodiment, the airfoil 24 may only include a single curved cooling passage defined on the pressure side 38, the suction side 40 or extending between the pressure and suctions sides 38, 40 of the airfoil 24.

As indicated above, the first and second cooling passages 60, 62 may be defined in the airfoil 24 such that a cooling medium may be supplied to portions of the airfoil 24 on and/or adjacent to the airfoil tip 36. Thus, in several embodiments, the cooling passages 60, 62 may have any suitable radial positioning and/or orientation within the airfoil 24 that permits the cooling medium to be directed onto or generally adjacent to the substantially horizontal plane defined by surface 64 of the airfoil tip 36. For example, in the illustrated embodiment, each of the cooling passages 60, 62 may have a substantially planar orientation and may extend lengthwise within the airfoil 24 substantially parallel to the tip surface 64. In such an embodiment, it should be appreciated that the radial distance 66 from each cooling passage 60, 62 to the tip surface 64 may generally remain constant between the upstream and downstream ends 68, 70 of the cooling passages 60, 62.

In another embodiment, each of the cooling passages 60, 62 may have an angled, planar orientation within the airfoil 24 such that the radial distance 66 to the tip surface 64 generally increases or generally decreases between the upstream and downstream ends 68, 70 of the cooling passages 60, 62. Additionally, it should be appreciated that, in alternative embodiments, the cooling passages 60, 62 may be defined in separate planes and/or one or both of the cooling passages 60, 62 may have a non-planar orientation within the airfoil 24. It should also be appreciated that the radial distance 66 defined between the first passage 60 and the tip surface 64 may be the same as or may differ from the radial distance 66 defined between the second passage 62 and the tip surface 64.

Additionally, in several embodiments of the present subject matter, the curvature of the first and second cooling passages 60, 62 may generally be configured to conform to the aerodynamic profile of the pressure and suction sides 38, 40 of the airfoil 24, respectfully, so that a cooling medium may be directed generally adjacent to the hot, outer surfaces of the airfoil 24. For example, in the illustrated embodiment, the first cooling passage 60 may extend lengthwise along a substantial portion of the pressure side 38 of the airfoil 24 and may define a varying radius of curvature that generally corresponds to the concave shape or profile of the pressure side 38. Similarly, the second cooling passage 62 may extend lengthwise along a substantial portion of the suction side 40 of the airfoil 24 and may define a varying radius of curvature that generally corresponds to the convex shape or profile of the suction side 40. By extending lengthwise along a substantial portion of the pressure and/or suction sides 38, 40 of the airfoil 24, it is meant that the cooling passages 60, 62 may extend lengthwise along greater than 50% of a width of the pressure and/or suction sides 38, 40 defined between the leading and trailing edges 42, 44 of the airfoil 24 (i.e., measured in a direction generally transverse to the radial direction), such as greater than 75% of the width between the leading and trailing edges 42, 44 or greater than 90% of the width between the leading and trailing edges 42, 44. As such, the cooling medium directed through the cooling passages 60, 62 may be supplied to the areas of the airfoil tip 36 generally adjacent to a substantial portion of the outer perimeter of the airfoil 24. In other embodiments, it should be appreciated that that the cooling passages 60, 62 need not be configured to extend along a substantial portion of the pressure anti/or suction sides 38, 40. For example, the cooling passages 60, 62 may only along extend along a portion of the pressure and/or suction sides 38, 40 which is less than or equal to 50% of the width between the leading and trailing edges 42, 44, in such embodiments, the cooling passage(s) 60, 62 may generally define a curvature that generally corresponds to the portion of the airfoil 24 along which the passage(s) 60, 62 is defined. It should also be appreciated that, in further embodiments of the present subject matter, the cooling passages 60, 62 may be configured to have any suitable curvature and, thus, need not define a curvature generally corresponding to the aerodynamic profile of the airfoil 24.

Further, as shown in FIGS. 3 and 4, the first and second cooling passages 60, 62 may generally be in flow communication with the airfoil cooling circuit 46 to permit the cooling medium flowing within the cooling circuit 46 to be directed through the cooling passages 60, 62. Thus, as shown in FIGS. 3 and 4, one or more cross-over passageways 72 may be defined in the airfoil 24 between each cooling passage and one or more of the cooling channels 48, 50, 52, 54 of the airfoil cooling circuit 46. As such, the cooling medium flowing through the airfoil cooling circuit 46 may be directed into the cooling passages 60, 62 by way of the cross-over passageways 72. It should be appreciated that, in one embodiment, the cross-over passageways 72 may be formed in the airfoil 24 by drilling a hole from a pressure side and/or a suction side surface of the airfoil 24 through the cooling passages 60, 62 and into one of the cooling channels 48, 50, 52, 54, with the hole being subsequently plugged (e.g., by weld-filling) at the pressure and/or suction side surface.

Alternatively, the cooling passages 60, 62 may be defined within the airfoil 24 such that the passages 60, 62 are in direct flow communication with the cooling channels 48, 50, 52, 54 of the airfoil cooling circuit 46. For example, similar to the cooling passages 161, 162 illustrated in FIGS. 5 and 6, the upstream ends 68 of the first and second cooling passages 60, 62 may be configured to extend directly into one or more of cooling channels 48, 50, 52, 54 of the airfoil cooling circuit 46 (e.g., the leading edge cooling channel 48) to permit the cooling medium to flow directly from the cooling circuit 46 into the cooling passages 60, 62.

Additionally, the cooling medium flowing through each of the cooling passages 60, 62 may generally be expelled from the passages 60, 62 using any suitable means and/or method known in the art. In one embodiment, the cooling passages 60, 62 may be defined in the airfoil such that the upstream and/or downstream ends 68, 70 of the cooling passages 60, 62 terminate at an exterior surface of the airfoil 24. For example, as shown in FIGS. 3 and 4, each cooling passage 60, 62 may include an upstream end 68 defining a cooling medium outlet 74 disposed generally adjacent to the leading edge 42 of the airfoil 24 and a downstream end 70 defining a second, shared cooling medium outlet 76 disposed at the trailing edge 44 of the airfoil 24. Accordingly, the cooling medium flowing through the passages 60, 62 may be expelled through such outlets 74, 76 and onto the surfaces of the leading and trailing edges 42, 44 of the airfoil 24. However, as indicated above, the cooling passages 60, 62 need not extend fully between the leading and trailing edges 42, 44 of the airfoil 24 but generally may be configured to extend along any portion of the pressure and suction sides 38, 40 of the airfoil 24. Thus, it should be appreciated that the upstream and downstream ends 68, 70 of the cooling passages 60, 62 may generally define cooling medium outlets 74, 76 at any suitable location along the outer perimeter of the airfoil 24. Additionally, in further embodiments, one or both of the cooling passages 60, 62 may include only a single cooling medium outlet. For instance, the cooling passages 60, 62 may be configured such that the upstream or downstream end 68, 70 of each cooling passage 60, 62 terminates within the interior of the airfoil 24.

In addition to exhausting the cooling medium through the ends 68, 70 of the cooling passages 60, 62 or as an alternative thereto, the cooling medium may be expelled through a plurality of film cooling holes 78, 80 defined in the airfoil 24. For example, as shown in FIGS. 3 and 4, a plurality of film cooling holes 78 may be defined in the airfoil between one or both of the cooling passages 60, 62 (e.g., the first cooling passage 60) and the pressure side 38 and/or the suction side 40 of the airfoil 24 (e.g., the pressure side 38) to permit the cooling medium to be expelled as film on the pressure and/or suction side surface. Alternatively, a plurality of film cooling holes 80 may defined in the airfoil between one or both of cooling passages 60, 62 (e.g., the second cooling passage 62) and the surface 64 of the airfoil tip 36 to permit the cooling medium to be expelled onto the tip surface 64. In such embodiments, it should be appreciated that the cooling medium flowing through the cooling passages 60, 62 may be expelled entirely through the film cooling holes 78, 80. For example, the cooling passages 60, 62 may be defined in the airfoil such that the upstream and downstream ends 68, 70 of each cooling passage 60, 62 terminates within the airfoil 24. Alternatively, the outlets 74, 76 formed at the upstream and downstream ends 68, 70 of the cooling passages 60, 62 may simply be plugged, such as by weld-filling or welding or brazing a physical plug into the ends 68, 70. It should be appreciated that the film cooling holes 78, 80 may generally be oriented in any suitable direction, such as by being oriented axially back and/or radially upward.

Referring now to FIGS. 5 and 6, there is illustrated another embodiment of a turbine bucket 20 having a plurality of curved cooling passages 160, 161, 162 for cooling an area of the bucket's airfoil 24 generally adjacent to the airfoil tip 36 in accordance with aspects of the present subject matter. Specifically, FIG. 5 illustrates a partial, perspective view of the bucket's airfoil 24 including a plurality of curved cooling passages 160, 161, 162 defined therein. FIG. 6 illustrates a top view of the airfoil 24 shown in FIG. 5, particularly illustrating the surface 64 of the airfoil tip 36.

Similar to the embodiment described above with reference to FIGS. 3 and 4, the curved cooling passages 160, 161, 162 may be defined in the airfoil 24 such that a cooling medium may be supplied to portions of the airfoil 24 on and/or adjacent to the airfoil tip 36. Thus, as shown, the cooling passages 160, 161, 162 may be configured to extend within the airfoil 24 generally adjacent to the tip surface 64. For example, the cooling passages 160, 161, 162 may have a substantially planar orientation and may extend lengthwise within the airfoil 24 substantially parallel to the tip surface 64 such that a radial distance 166 from each cooling passage 160, 161, 162 to the tip surface 64 generally remains constant between the upstream and downstream ends 168, 170 of each cooling passage 160, 161, 162. Alternatively, the cooling passages 160, 161, 162 may have a planar, angled orientation such that the radial distances 166 increase or decrease as the cooling passages 160, 161, 162 extend within the airfoil 24. In further embodiments, each cooling passage 160, 161, 162 may be defined in a separate plane and/or some or all the cooling passages 160, 161, 162 may have a non-planar orientation within the airfoil 24. Moreover, the radial distance 166 defined between a particular cooling passage 160, 161, 162 and the tip surface 64 may be the same as or may differ from the radial distances 166 defined between the other cooling passages 160, 161, 162 and the tip surface 64.

Additionally, in several embodiments of the present subject matter, the curvature of the cooling passages 160, 161, 162 may generally be configured to conform to the aerodynamic profile of the airfoil 24 so that a cooling medium may be directed along at least a portion of the outer perimeter of the airfoil 24. Thus, in the illustrated embodiment, the cooling passages 160, 161, 162 may be defined along the pressure side 38 of the airfoil 24 and may generally be configured to conform to the concave shape or profile of the pressure side 38 of the airfoil 24. For instance, each cooling passage 160, 161, 162 may define a different radius of curvature depending on the shape or profile of the portion of the pressure side 38 along which the passage 160, 161, 162 is defined. Specifically, as particularly shown in FIG. 6, the cooling passage 160 disposed closest to the leading edge 42 may define a relatively small radius of curvature generally corresponding to the abrupt curvature of the portion of the pressure side 38 extending directly from the leading edge 42. In contrast, the cooling passage 162 extending towards the trailing edge 40 of the airfoil 24 may have a relatively large radius of curvature generally corresponding to the gradual curvature of such portion of the airfoil 24. Accordingly, the cooling medium directed through the cooling passages 160, 161, 162 may be supplied to the areas of the airfoil 24 generally adjacent to the hot, outer surface of the pressure side 38 of the airfoil 24.

In other embodiments, it should be appreciated that one or more curved cooling passages 160, 161, 162 may also be defined on the suction side 40 of the airfoil 24 to permit a cooling medium to be direct along the outer surface of the suction side 40. Additionally, it should be appreciated that, although three cooling passages 160, 161, 162 are illustrated in FIGS. 5 and 6, any number of cooling passages may generally be defined along the pressure side 38 and/or suction side 40 of the airfoil 24.

Further, the cooling passages 160, 161, 162 may generally be configured to be in flow communication with the airfoil cooling circuit 46 to permit a cooling medium to be supplied to the cooling passages 160, 161, 162. For example, as shown, all or a portion of the cooling passages 160, 161, 162 may be defined in the airfoil 24 such that the upstream ends 168 of the cooling passages 160, 161, 162 are in direct flow communication with one or more of the cooling channels 48, 50, 52, 54 of the airfoil cooling circuit 46. In another embodiment, one or more cross-over passageways 172 may be defined in the airfoil 24 between two or more of the cooling passages 160, 161, 162 such that a portion of the cooling medium flowing through one of the cooling passages 160, 161, 162 may be diverted to another cooling passage 160, 161, 162. For example, as particularly shown in FIG. 6, a cross-over passageway 172 may be defined between the cooling passage 160 defined closest to the leading edge 38 of the airfoil 24 and the adjacent cooling passage 161 such that a portion of the cooling medium flowing through the adjacent cooling passage 161 may be diverted to the leading edge cooling passage 160. It should be appreciated that, in one embodiment, the cross-over passageway 172 may be formed in the airfoil 24 by drilling a hole from the pressure side surface of the airfoil 24 through the cooling passage 160 and into the adjacent cooling passage 161, with the hole being subsequently plugged (e.g., by weld-filling) at the pressure side surface.

Alternatively, one or more cross-over passageways (not shown) may be may be defined in the airfoil 24 between the cooling channels 48, 50, 52, 54 of the airfoil cooling circuit 46 and each cooling passage 160, 161, 162 to permit cooling medium to be directed from the cooling circuit 46 to the cooling passages 160, 161, 162. In even further embodiments, two or more of the cooling passages 160, 161, 162 may be configured to intersect within the airfoil 24 such that the cooling medium may be transferred directly between such cooling passages 160, 161, 162.

Additionally, similar to the embodiment described above, the cooling medium flowing through each of the cooling passages 160, 161, 162 may be expelled from the passages using any suitable means and/or method known in the art. For example, as shown, the cooling passages 160, 161, 162 may define cooling medium outlets 174 at their upstream and/or downstream ends 168, 170 such that the cooling medium may be expelled onto the exterior surface(s) of the airfoil 24 at various different locations. In addition to such cooling medium outlets 174 or as an alternative thereto, the cooling medium may be expelled through a plurality of film cooling holes 78, 80 (FIGS. 3 and 4) defined in the airfoil 24 between the cooling passages 160, 161, 162 and the pressure side 38 and/or the suction side 40 of the airfoil 24 and/or between the cooling passages 160, 161, 162 and the tip surface 64 of the airfoil 24 to permit the cooling medium to be expelled as film on such exterior surfaces.

Referring now to FIGS. 7 and 8, there is illustrated a further embodiment of a turbine bucket 20 having a plurality of curved cooling passages 260, 261, 262 for cooling an area of the bucket's airfoil 24 generally adjacent to the airfoil tip 36 in accordance with aspects of the present subject matter. Specifically, FIG. 7 illustrates a partial, side view of the bucket's airfoil 24 including a plurality of curved cooling passages 260, 261, 262 defined therein. FIG. 8 illustrates a top view of the airfoil 24 shown in FIG. 7, particularly illustrating the surface 64 of the airfoil tip 36.

As shown in FIGS. 7 and 8, a plurality of curved cooling passages 260, 261, 262 may be defined on the pressure side 38 of the airfoil 24 generally adjacent to the airfoil tip 36. Thus, similar to the embodiment described above with reference to FIGS. 5 and 6, the cooling passages 260, 261 262 may generally be configured to conform to the concave shape or profile of the pressure side 38 of the airfoil 24. For example, each cooling passage 260, 261, 262 may define a different radius of curvature depending on the shape or profile of the portion of the pressure side 38 along which the passage 260, 261, 262 is defined. As such, the cooling medium directed through the cooling passages 260, 261, 262 may be supplied to the areas of the airfoil 24 generally adjacent to the hot, outer surface of the pressure side 38 of the airfoil 40. In alternative embodiments, it should be appreciated that one or more cooling passages 260, 261, 262 may also be defined on the suction side 40 of the airfoil 24 to permit a cooling medium to be direct along the outer surface of the suction side 40.

Additionally, as particularly shown in FIG. 7, each of the cooling passages 260, 261, 262 may be angled radially within the airfoil 24 between its downstream and upstream ends 268, 270. Thus, the radial distance 266 between each cooling passage 260, 261, 262 and the tip surface 64 may generally vary as the cooling passages 260, 261, 262 extend lengthwise within the airfoil 24. For example, in the illustrated embodiment, the cooling passages 260, 261, 262 may be angled radially upwards between their upstream and downstream ends 268, 270 such that a cooling medium outlet 274 is defined in the surface 64 of airfoil tip 36 at the downstream end 270 of each cooling passage 260, 261, 262. As such, the cooling medium directed through the cooling passages 260, 261, 262 may be expelled through the cooling medium outlets 274 as a film on the tip surface 64. Alternatively, the cooling passages 260, 261, 262 may be angled radially downwards between their upstream and downstream ends 268, 270 such that the cooling medium outlets 274 are defined at the upstream end 268 of each cooling passage 260, 261, 262. In other embodiments, the upstream and downstream ends 268, 270 of each of the cooling passages 260, 261, 262 may terminate within the interior of the airfoil 24 such that the cooling medium may be directed generally adjacent to the tip surface 64 without being expelled onto such surface 64. It should also be appreciated that, in several embodiments, each of the cooling passages 260, 261, 262 need not be defined in the airfoil 24 so as to have an angled orientation relative to the tip surface 64. For example, in a particular embodiment, a portion of the plurality of cooling passages 260, 261, 262 may extend lengthwise within the airfoil 24 substantially parallel to the tip surface 64 while other passages 260, 261, 262 may extend radially upwards towards or radially downwards away from the tip surface 64.

Additionally, it should be appreciated that, similar to the embodiments described above, the cooling medium may be supplied to and expelled from the cooling passages 260, 261, 262 using any suitable means and/or method. For example, in the illustrated embodiment, the cooling passages 260, 261, 262 are in direct flow communication with the cooling channels 48, 50, 52 54 of the airfoil cooling circuit 44. Alternatively, one or more cross-over passageways (not shown) may be utilized to direct the cooling medium between the airfoil cooling circuit 44 and the cooling passages 260, 261, 262 and/or between each of the cooling passages 260, 261, 262. In another embodiment, the cooling passages 260, 261, 262 may be configured so as to intersect one another within the airfoil 24 to permit the cooling medium to be transferred between the cooling passages 260, 261, 262. Additionally, as indicated above, the cooling medium may be configured to be expelled through the cooling medium outlets 274 defined in the tip surface 64. Alternatively, the cooling medium may be expelled through a plurality of film-cooling holes (not shown) defined in the airfoil 24 between the cooling passages 260, 261, 262 and the pressure side 38 and/or suction side 40 of the airfoil 24 and/or between the cooling passages 260, 261, 261 and the tip surface 64.

In general, it should be appreciated that the curved cooling passages described herein may be formed within the airfoil 24 using any suitable means known in the art. For example, the curved cooling passages may be formed using an electrical discharge machining ("EDM") process or a casting process. However, in a particular embodiment of the present subject matter, the curved cooling passages may be formed using a curved shaped-tube electrochemical machining ("STEM") process. The curved STEM process is generally disclosed in application Ser. No. 12/562,528 Curved Electrode and Electrochemical Machining Method and Assembly Employing the Same filed on Sep. 18, 2009 and assigned to the General Electric Company. Generally, unlike a conventional STEM drilling process, the curved STEM process utilizes a curved STEM electrode operatively connected to a rotational driver. The rotational driver is configured to move the electrode along a curved path within an object to be machined, such as a bucket airfoil 24. As the rotational driver rotates the curved electrode along the curved path, a pulsed voltage supplied to the electrode from a power source allows portions of the object to be machined to be electroeroded away to define a curved passage within the object.

Additionally, one of ordinary skill in the art should appreciate that, in addition to the embodiments described herein, a variety of other cooling patterns and/or arrangements may be utilized to direct a cooling medium throughout portions of an airfoil 24 within the scope of the present subject matter. Thus, it should be appreciated that the arrangement of the curved cooling passages within the airfoil 24 may be varied significantly to modify the cooling performance of the passages and, thus, provide for preferential cooling of the airfoil 24. Moreover, in several embodiments of the present subject matter, the curved cooling passages may be defined in the airfoil 24 at locations other than generally adjacent to the airfoil tip 36. For example, in a particular embodiment, a plurality of rows of curved cooling passages may be defined on the pressure and/or suction side 38, 40 of the airfoil 24 along the entire radial length of the airfoil 24 between the airfoil base 34 and the airfoil tip 36. As such, a curved cooling passage arrangement may be provided for the entire airfoil 24.

Further, it should be appreciated that the cooling passages of the present subject matter may generally have any suitable cross-sectional shape. For example, in the illustrated embodiments, the cooling passages generally have a circular cross-section. However, in alternative embodiments, the cooling passages may have an elliptical, flattened, rectangular or any other suitable non-circular cross-section depending on the desired cooling performance of the cooling passages. Additionally, the cross-sectional area of each cooling passage may remain constant or may be varied along the length of the cooling passage. For instance, the size of the tooling used to form the cooling passages may be changed during the manufacturing process to alter the cross-sectional area of the cooling passages. Thus, in one embodiment, a particular sized curved STEM electrode may be used to form a first section of a curved cooling passage and then a smaller sized curved STEM electrode may be used to form the remainder of the cooling passage.

Additionally, in a particular embodiment of the present subject matter, the curved cooling passages may be turbulated along their length. As used herein, the term "turbulated" means that the surface of the cooling passages may have grooves, ridges, or may otherwise have periodic surface contouring so as to introduce turbulence into the flow of the cooling medium. Thus, for example, a cross-sectional view of one embodiment of a turbulated cooling passage 360 is illustrated in FIG. 9. As shown, the turbulated cooling passage 360 include ridges 390 formed along its length to create turbulence in the cooling medium flow. This turbulence may enhance the cooling performance of the cooling passage 360 by increasing heat transfer between the cooling medium and the airfoil 24. It should be appreciated that the ridges 390 need not have the exact shape and configuration as depicted in FIG. 9, but may generally have any shape and/or configuration designed to create turbulence in the cooling medium flow. Thus, in alternative embodiments, the ridges 390 may have a substantially square profile and/or may be formed so as to project into the airfoil 24 instead of into the cooling passage 360. It should also be appreciated that the ridges, grooves, or other periodic surface contouring may be formed in the surface of the cooling passage 360 by any means generally known in the art. For example, ridges and/or grooves may be formed by varying the tool feed rate of the tool used to form the cooling passage 390. Alternatively, in another embodiment, a curved STEM electrode used in the curved STEM process may only be partially covered with an insulating coating, thereby exposing sections of the electrically conductive portion of the electrode to the surface of the cooling passage 390 to create surface contouring.

Moreover, it should be appreciated that the curved cooling passages disclosed herein may be supplied cooling medium from a cooling medium source other than the airfoil cooling circuit 46. For example, the hollow cavity 30 of the shank portion 22 may be pressurized with a cooling medium, such as air, to prevent combustion products flowing in the hot gas path from being ingested between turbine buckets 20. In such case, a supply passage (not shown) may be defined through the platform 26 and may extend radially upwards towards the tip 36 of the airfoil 24 to permit the cooling medium disposed within the cavity 30 to be supplied to the cooling passages.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbine component comprising:
an airfoil having a base and a tip disposed opposite the base, the airfoil further including a pressure side and a suction side extending between a leading edge and a trailing edge;
an airfoil cooling circuit at least partially disposed within the airfoil, the airfoil cooling circuit being configured to supply a cooling medium through the airfoil; and
a curved cooling passage defined in the airfoil, the curved cooling passage being in flow communication with the airfoil cooling circuit such that the cooling medium flowing through the airfoil cooling circuit is directed into the curved cooling passage,
wherein the curved cooling passage extends lengthwise within the airfoil between a first end defined through an exterior surface of the airfoil at a first location and a second end defined through the exterior surface of the airfoil at a second location.

2. The turbine component of claim 1, wherein the turbine component comprises a turbine bucket.

3. The turbine component of claim 1, wherein the curved cooling passage is defined in the airfoil generally adjacent to the tip.

4. The turbine component of claim 1, wherein the curvature of the curved cooling passage is configured to generally correspond to at least a portion of an aerodynamic profile of one of the pressure side or the suction side of the airfoil.

5. The turbine component of claim 1, wherein the curved cooling passage extends lengthwise along a substantial portion of the pressure side of the airfoil, the curved cooling passage defining a varying radius of curvature generally corresponding to an aerodynamic profile of the pressure side.

6. The turbine component of claim 1, wherein the curved cooling passage is in flow communication with the airfoil cooling circuit through a cross-over passageway.

7. The turbine component of claim 1, wherein the curved cooling passage has a planar orientation within the airfoil and extends lengthwise within the airfoil substantially parallel to a surface of the tip.

8. The turbine component of claim 1, wherein each of the first and second ends of the curved cooling passage forms a cooling medium outlet-along the exterior surface of the airfoil such that at least a portion of the cooling medium directed through the curved cooling passage is expelled through each cooling medium outlet.

9. The turbine component of claim 1, wherein a plurality of film cooling holes is defined in the airfoil between the curved cooling passage and the exterior surface of the airfoil such that at least a portion of the cooling medium directed through the curved cooling passage is expelled through the plurality of film cooling holes.

10. The turbine component of claim 1, wherein the curved cooling passage is turbulated along its length.

11. The turbine component of claim 1, wherein at least one of the first end or second end is plugged at the exterior surface of the airfoil.

12. A turbine component comprising:
an airfoil having a base and a tip disposed opposite the base, the airfoil further including a pressure side and a suction side extending between a leading edge and a trailing edge;
an airfoil cooling circuit at least partially disposed within the airfbil, the airfoil cooling circuit being configured to supply a cooling medium through the airfoil; and
a plurality of curved cooling passages defined in the airfoil generally adjacent to the tip, the plurality of curved cooling passages being in flow communication with the airfoil cooling circuit such that the cooling medium flowing through the airfoil cooling circuit is directed into the plurality of curved cooling passages,
wherein each of the plurality of curved cooling passages extends lengthwise within the airfoil between a first end defined through an exterior surface of the airfoil at a first location and a second end defined through at the exterior surface of the airfoil at a second location.

13. The turbine component of claim 12, wherein the turbine component comprises a turbine bucket.

14. The turbine component of claim 12, wherein the curvature of each of the plurality of curved cooling passages is configured to generally correspond to at least a portion of an aerodynamic profile of one of the pressure side or the suction side of the airfoil.

15. The turbine component of claim 12, wherein at least one of the plurality of curved cooling passages has a planer orientation within the airfoil and extends lengthwise within the airfoil substantially parallel to a surface of the tip.

16. The turbine component of claim 12, wherein the first and second ends of at least one of the plurality of curved cooling passages form cooling medium outlets along the exterior surface of the airfoil such that at least a portion of the cooling medium directed through the at least one curved cooling passage is expelled through the cooling medium outlets.

17. The turbine component of claim 12, wherein a plurality of film cooling holes are defined in the airfoil between at least one of the plurality of cooling passages and the exterior surface of the airfoil such that at least a portion of the cooling medium directed through the at least one curved cooling passage is expelled through the plurality of film cooling holes.

18. The turbine component of claim 12, wherein at least one of the plurality of curved cooling passages is turbulated along its length.

19. The turbine component of claim 12, wherein at least one of the first end or second end is plugged at the exterior surface of the airfoil.

* * * * *